United States Patent

Yajima et al.

[11] Patent Number: 6,148,150
[45] Date of Patent: Nov. 14, 2000

[54] IMAGE BLUR CORRECTING APPARATUS FOR USE IN CAMERA

[75] Inventors: Shinya Yajima; Hiroyuki Kawamura, both of Omiya, Japan

[73] Assignee: Fuji Photo Optical Co., Ltd., Omiya, Japan

[21] Appl. No.: 09/359,031

[22] Filed: Jul. 23, 1999

[30] Foreign Application Priority Data

Jul. 24, 1998 [JP] Japan .................... 10-209484

[51] Int. Cl.[7] .................... G03B 17/00; H04N 5/225
[52] U.S. Cl. .................... 396/55; 396/428; 348/208; 348/373
[58] Field of Search .................... 396/55, 419, 428; 348/208, 373

[56] References Cited

U.S. PATENT DOCUMENTS

| | | | |
|---|---|---|---|
| 4,623,930 | 11/1986 | Oshima et al. | 348/208 |
| 4,731,669 | 3/1988 | Hayashi et al. | 348/208 |
| 5,237,363 | 8/1993 | Okada et al. | 396/55 |
| 5,450,126 | 9/1995 | Nishida | 348/208 |
| 5,771,406 | 6/1998 | Sakamoto et al. | 396/55 |
| 5,778,261 | 7/1998 | Tanaka et al. | 396/55 |
| 5,826,115 | 10/1998 | Washisu et al. | 396/55 |

*Primary Examiner*—W. B. Perkey
*Attorney, Agent, or Firm*—Nixon Peabody LLP; David S. Safran

[57] ABSTRACT

An image blur correcting apparatus is controlled in accordance with panhead data signals received from a panhead apparatus to save energy while compensating the performance of the panhead apparatus with an image blur correcting function of the image blur correcting apparatus. The panhead apparatus outputs a variety of panhead data signals such as a panhead identification signal representing the type of the panhead apparatus, a signal representing the panning or tilting operation, a signal representing a panning or tilting speed, and a signal representing a panning or tilting position. The image blur correcting apparatus receives the panhead data signals through a signal transmission part, and automatically turns on or off the image blur correcting function and adjusts a sensitivity, in accordance with the performance of the panhead apparatus and the panning/tilting speed and/or positions.

4 Claims, 3 Drawing Sheets

IMAGE BLUR CORRECTING APPARATUS FOR USE IN CAMERA

BACKGROUND OF THE INVENTION

1. Field of the Invention

The present invention relates generally to an image blur correcting apparatus for use in a camera, and more particularly to an image blur correcting apparatus for use in a TV camera or the like and correcting an image blur resulting from the vibration of the camera.

2. Description of Related Art

Conventionally, a camera provided with an image blur correcting apparatus supports an image blur correcting lens in a lens barrel of the camera (or of a lens apparatus) in such a manner that the image blur correcting lens is movable in a plane perpendicular to an optical axis. When the camera is vibrated, an actuator moves the image blur correcting lens in a direction to offset the change of an image resulting from the vibration to thereby prevent the image from being blurred. Also well known is an electrically-panning/tilting apparatus for such as a monitor camera, which is mounted on a panhead.

If the above-mentioned image blur correcting apparatus is combined with the above-mentioned electric panhead apparatus, the problems occur as described below. The conventional image blur correcting apparatus keeps its image blur correcting function on to thereby control the actuator instantaneously in response to the vibration. If the image blur seldom occurs, or if the correction of the image blur is substantially meaningless, however, the image blur correcting apparatus wastes electric power as a result.

The characteristics (performances) of the electric panhead apparatuses vary according to the types. For example, one panhead apparatus easily vibrates while panning at lower speed than a certain speed, and another panhead apparatus vibrates less in the tilting than in the panning.

SUMMARY OF THE INVENTION

In view of the foregoing, it is an object of the present invention to provide an image blur correcting apparatus for use in a camera, which is combined with a panhead apparatus to thereby compensate the performances of the panhead apparatus with an image blur correcting function thereof and is possible to save energy.

To achieve the above-mentioned object, the present invention is directed to an image blur correcting apparatus for correcting an image blur resulting from a vibration of a camera, the image blur correcting apparatus comprising: a signal receiver for receiving a panhead data signal outputted from a panhead apparatus on that the camera is mounted; and a controller for turning on and off an image blur correcting function of the image blur correcting apparatus in accordance with the panhead data signal received through the signal receiver.

The present invention is also directed to an image blur correcting apparatus for correcting an image blur resulting from a vibration of a camera, the image blur correcting apparatus comprising: a signal receiver for receiving a panhead data signal outputted from a panhead apparatus on that the camera is mounted; and a controller for adjusting a vibration sensitivity of the image blur correcting apparatus in accordance with the panhead data signal received through the signal receiver.

According to the present invention, the panhead apparatus outputs a variety of panhead data signals such as a panhead identification signal representing the type of the panhead, a signal representing the panning or tilting operation, a signal representing a panning or tilting speed, and a signal representing a panning or tilting position. The image blur correcting apparatus receives the panhead data signals through the signal receiver. The control means automatically turns on or off the image blur correcting function or adjusts the sensitivity in accordance with the performance of the panhead and the panning/tilting speed or position.

The image blur correcting apparatus thus compensates the performance of the panhead apparatus. If it is substantially unnecessary to correct the image blur, the image blur correcting function is turned off to save energy.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

This invention will be described in further detail by way of example with reference to the accompanying drawings.

Figure 1:
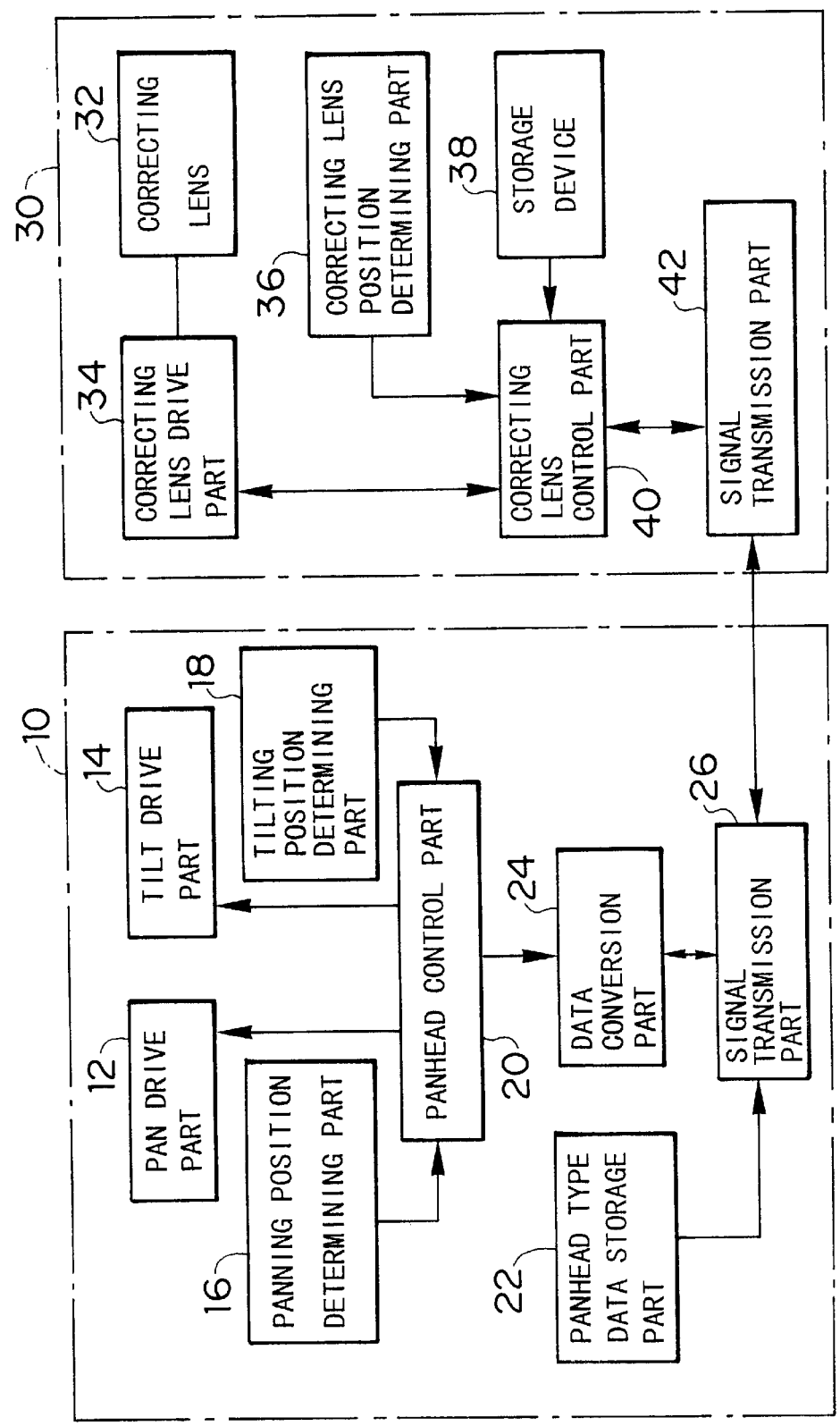
FIG. 1 is a block diagram showing a system, in which an image blur correcting apparatus according to a preferred embodiment of the present invention is combined with a panhead apparatus.

FIG. 1 is a block diagram showing a system, in which a panhead apparatus 10 is combined with an image blur correcting apparatus 30, according to a preferred embodiment of the present invention. The pan head apparatus 10 comprises a pan drive part 12, a tilt drive part 14, a panning position determining part 16, a tilting position determining part 18, a panhead control part 20, a panhead type data storage part 22, a data conversion part 24 and a signal transmission part 26. A camera (not shown), e.g., a TV camera, is mounted on the panhead apparatus 10.

The pan drive part 12 includes a pan drive motor (not shown). The pan drive part 12 horizontally rotates the camera by the pan drive motor in accordance with control signals transmitted from the panhead control part 20. The panning position determining part 16 determines a rotational position (a panning position) of the camera in a horizontal direction, and transmits a determination signal to the panhead control part 20.

The tilt drive part 14 includes a tilt drive motor (not shown). The tilt drive part 14 vertically tilts the camera by the tilt drive motor in accordance with control signals transmitted from the panhead control part 20. The tilting position determining part 18 determines a tilting angle (a tilting position) of the camera in a vertical direction, and transmits a determination signal to the panhead control part 20.

The panhead type data storage part 22 contains various pieces of data relating to the panhead apparatus 10, e.g. the type identification data representing the type of the panheads and the performance data representing the performance (the characteristics) of the panheads. The data conversion part 24 converts a variety of signals outputted from the panhead control part 20 into signals with an appropriate form for a preset communication mode. For example, a panning operation signal, a tilting operation signal, a panning position signal, a tilting position signal, a pan speed signal and a tilt speed signal are converted into signals with the appropriate form and are outputted to the signal transmission part 26. The data conversion part 24 also converts signals received through the signal transmission part 26 into signals with an appropriate form for input of the panhead control part 20.

The signal transmission part 26 outputs signals outputted from the panhead type data storage part 22 and the data conversion part 24 to the image blur correcting apparatus 30 in the communication mode, and also receives the signals from the image blur correcting apparatus 30. The data may be transmitted by either analog signals or digital signals between the panhead apparatus 10 and the image blur correcting apparatus 30. The data may be transmitted by either wire communication or non-contact (wireless) communication by infrared light or radio waves, in serial communication or parallel communication.

The image blur correcting apparatus 30 comprises a correcting lens 32, a correcting lens drive part 34, a correcting lens position determining part 36, a storage device 38, a correcting lens control part 40 and a signal transmission part 42. The image blur correcting apparatus 30 may be built in the camera or a lens apparatus (not shown) mounted to the camera, or the image blur correcting apparatus 30 may be detachably disposed between the lens apparatus and the camera.

Although the structure where the correcting lens 32 is supported will later be described in detail, the correcting lens drive part 34 moves the correcting lens 32 within a plane perpendicular to the optical axis. The correcting lens control part 40 controls the correcting lens drive part 34.

The correcting lens position determining part 36 determines the position of the correcting lens 32, and transmits a determination signal to the correcting lens control part 40. The storage device (e.g. a ROM) 38 contains detailed data relating to the performances of multiple kinds of panheads (hereinafter the data will be referred to as type data). The image blur correcting apparatus 30 reads corresponding type data from the storage device 38 according to the type identification signal, representing the type of the panhead, transmitted from the panhead apparatus 10. It is possible to update (change) or add the type data stored in the storage device 38 by an information input device (not shown).

The signal transmission part 42 receives the signals from the signal transmission part 26 of the panhead apparatus 10, and outputs the signals outputted from the correcting lens control part 40 to the panhead apparatus 10 in the predetermined communication mode.

The correcting lens control part 40 controls the correcting lens drive part 34 in accordance with the signals received from the panhead apparatus 10, the determination signals transmitted from the correcting lens position determining part 36, the type data read from the storage device 38, etc.

Figure 2:
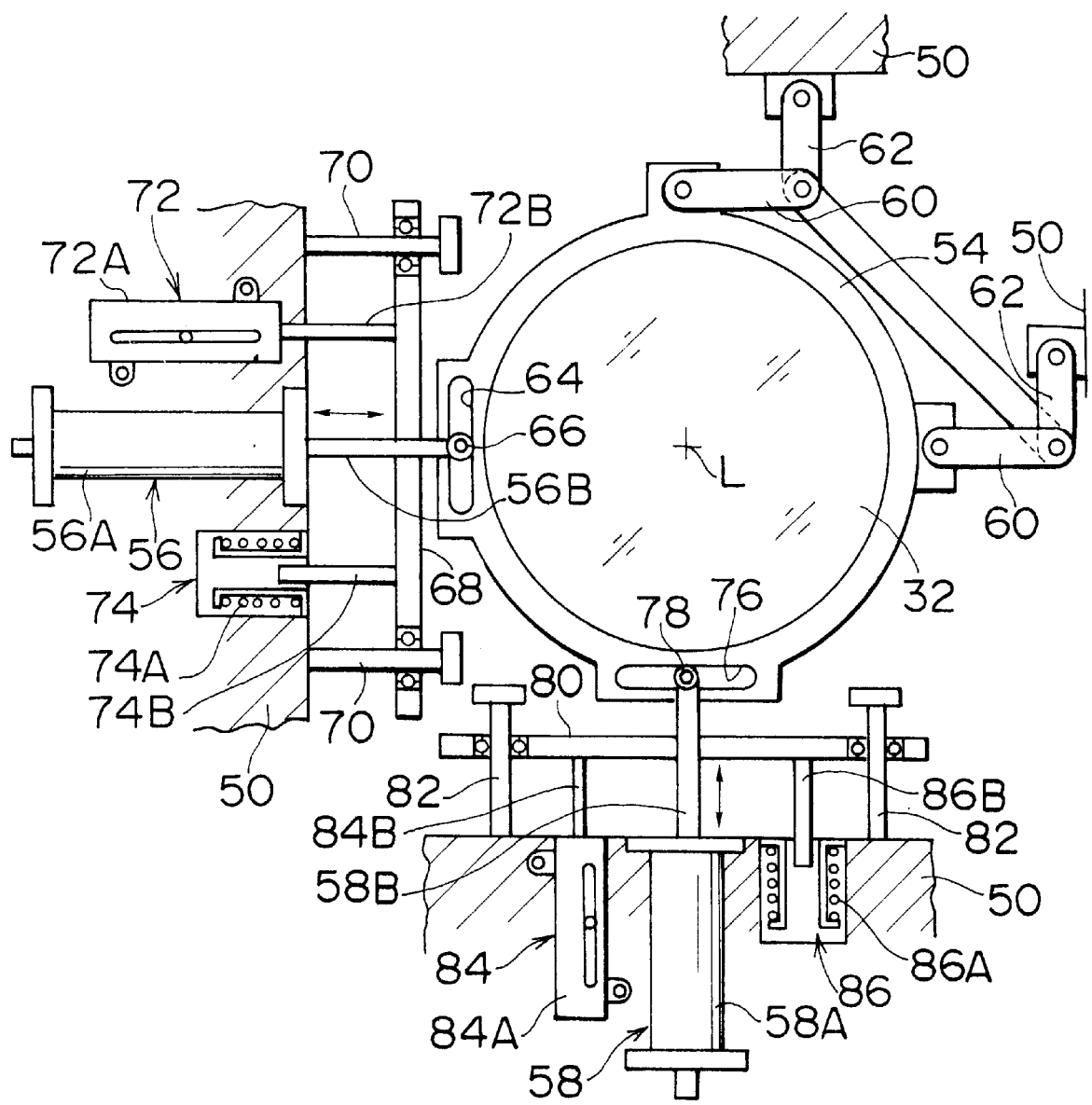
FIG. 2 is a front view showing an example of the state wherein a correcting lens is supported in the image blur correcting apparatus.

FIG. 2 is a front view showing an example of the structure wherein the correcting lens 32 is supported in the image blur correcting apparatus 30. FIG. 2 shows the state wherein the image blur correcting apparatus 30 is built in the lens apparatus. The correcting lens 32 is held by a lens frame 54 in a lens barrel 50. Linear motors (equivalent to the correcting lens drive part 34 in FIG. 1) 56, 58 move the correcting lens 32 in a direction to prevent the image from being blurred within a plane perpendicular to the optical axis L.

The correcting lens 32 is movably supported in the lens barrel 50 through a parallel link mechanism, which is composed of two pairs of arms 60, 62.

The linear motor 56 moves the correcting lens 32 horizontally in FIG. 2, and the linear motor 56 comprises a motor body 56A and a rod 56B. The motor body 56A is fixed to the lens barrel 50, and the end of the rod 56B is fitted in a slot 64 of the lens frame 54 through a roller 66. The slot 64 is formed vertically at the left side of the lens frame 54, and the slot 64 is movable vertically relative to the roller 66.

When the rod 56B expands or contracts, the lens frame 54 is pushed or pulled by the rod 56B to move horizontally in FIG. 2. When a vertical forces is applied to the lens frame 54, the slot 64 moves vertically with the guide of the roller 66 and the correcting lens 32 moves vertically.

A connecting frame 68 is secured to the rod 56B of the linear motor 56. The connecting frame 68 is arranged vertically, and the rod 56B is secured to the center of the connecting frame 68. The upper and lower ends of the connecting frame 68 are slidably supported by linear guides 70. The linear guides 70 are parallel with the rod 56B. Consequently, the expansion or contraction of the rod 56B horizontally moves the connecting frame 68 with its posture being unchanged.

The end of a contact needle 72B of a position sensor 72 is pressed against the connecting frame 68. A sensor body 72A is fixed to the lens barrel 50 such that the contact needle 72B can be parallel with the rod 56B. The position sensor 72 determines the moving amount of the connecting frame 68, which moves parallel due to the expansion or contraction of the rod 56B. Since the connecting frame 68 moves parallel with its posture being unchanged regardless of the expanding or contracting amount of the rod 56B, the contact needle 72B never slides or slips from the connecting frame 68 during the movement of the connecting frame 68. Reference numeral 74 is a speed generator for measuring a horizontal moving speed of the correcting lens 32 to prevent hunting of the correcting lens 32. The speed generator 74 is composed of a bobbin 74A and a core 74B. The bobbin 74A is fixed to the lens barrel 50, and the right end of the core 74B is secured to the connecting frame 68.

On the other hand, the linear motor 58 moves the correcting lens 32 vertically in FIG. 2, and the linear motor 58 comprises a motor body 58A and a rod 58B. A mechanism for vertically moving the correcting lens 32 will not be described in detail since it is the same as the previously-mentioned mechanism for horizontally moving the correcting lens 32. Reference numerals designating the corresponding members are only mentioned, and their operation will not be described here. More specifically, a horizontal slot 76 is formed at the bottom of the lens frame 54, and the end of the rod 58B is fitted in the slot 76 through a roller 78. A connecting frame 80 is secured to the rod 58B, and the right and left ends of the connecting frame 80 are slidably supported on linear guides 82. The end of a contact needle 84B of a position sensor 84 is pressed against the bottom of the connecting frame 80. A sensor body 84A is fixed to the lens barrel 50 such that the contact needle 84B can be parallel with the rod 58B. Reference numeral 86 is a speed generator for measuring a vertical moving speed of the correcting lens 32 to prevent hunting of the correcting lens 32. The speed generator 86 is composed of a bobbin 86A and a core 86B. The bobbin 86A is fixed to the lens barrel 50, and the top end of the core 86B is secured to the connecting frame 80.

The lens barrel 50 is provided with two angular velocity sensors (not shown), which are attached at the side and top of the lens barrel 50, respectively. The former angular velocity sensor measures horizontal element of vibrations applied to the lens barrel 50, and the latter angular velocity sensor measures vertical element of vibrations applied to the lens barrel 50.

The data obtained by the angular velocity sensors are transmitted to the correcting lens control part 40. The correcting lens control part 40 calculates horizontal and vertical correction movement amounts for the correcting lens 32 to offset the change of the image resulting from the vibration in accordance with the data outputted from the angular velocity sensors. Signals representing the horizontal and vertical correction movement amounts are amplified by amplifiers, and then they are applied to the linear motors 56, 58. The linear motors 56, 58 expands or contracts the rods 56B, 58B by the amounts corresponding to the signals applied from the correcting lens control part 40. Consequently, the correcting lens 32 corrects the image blur caused by the vibrations of the camera.

In accordance with various signals outputted from the panhead 10, the correcting lens control part 40 performs various kinds of controls in the image blur correcting function wherein the correcting lens 32 moves.

A description will now be given of control methods of the image blur correcting apparatus 30, which is constructed in the above-mentioned manner.

The image blur correcting apparatus 30 controls the image blur correcting function in accordance with a variety of signals outputted from the panhead apparatus 10 as described below.

In the first control method, if the panning or tilting speed of the panhead apparatus 10 exceeds a preset value (the first set value), the image blur correcting apparatus 30 turns off the image blur correcting function. The set value can be changed according to types of the panhead apparatuses 10. The set value may be zero (i.e. the image blur correcting function may be always OFF during the panning and tilting operations). If the panning or tilting is performed at a very high speed, it may be unnecessary to correct the image blur resulting from vibrations of the camera. In this case, the image blur correcting function is turned off to save energy.

In particularly, if the panning or tilting is performed at a low speed, there is a necessity of correcting the image blur. For this reason, the image blur correcting function may be usually OFF during the panning and tilting operations, and the image blur correcting function may be turned on if the panning or tilting speed is lower than a preset value (the second set value).

In the second control method, an image blur correcting sensitivity is adjusted according to the panning or tilting position. The panhead apparatuses 10 have their own characteristics according to the types, locations, or the like. Some panhead apparatuses vibrate easily at a specific panning or tilting position. The sensitivity of the image blur correcting apparatus 30 is adjusted so as to compensate the characteristics of the panhead apparatus 10, thereby obtaining a stable image.

In the third control method, a horizontal image blur correcting function (a correcting function for horizontal vibrations) of the image blur correcting apparatus 30 may be OFF and only a vertical image blur correcting function (a correcting function for vertical vibrations) may be ON during the panning operation. The panning means the horizontal rotation of the camera, and thus, the necessity of correcting the image blur in the horizontal direction is less than that in the vertical direction. Accordingly, only the vertical image blur correcting function is ON and the horizontal image blur correcting function is OFF during the panning operation. Of course, it is possible to combine the second control method with the third control method.

Similarly, the vertical image blur correcting function may be OFF and only the horizontal image correcting function may be ON during the tilting operation.

Figure 3:
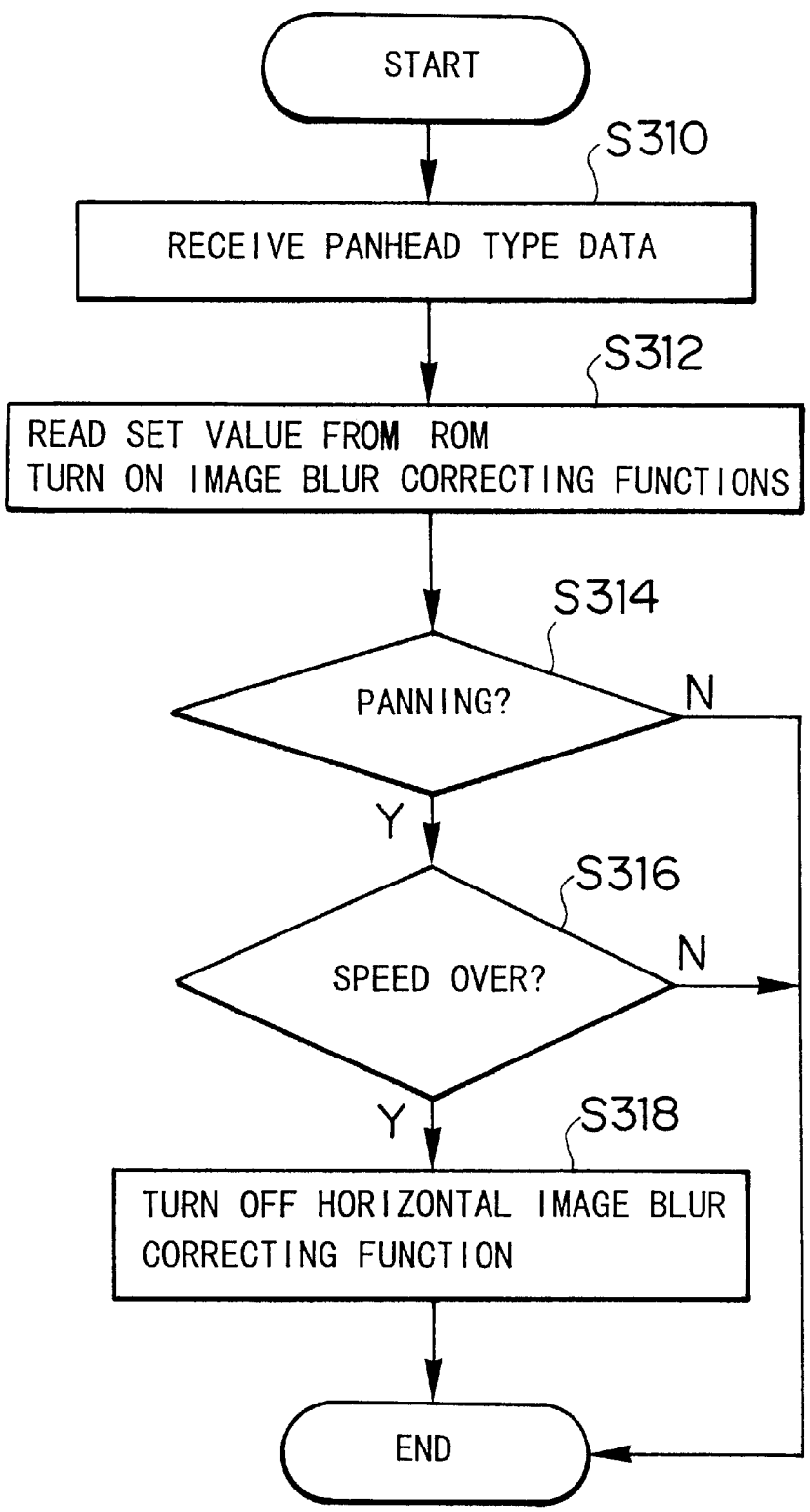
FIG. 3 is a flow chart showing an example of a control method of the image blur correcting apparatus.

FIG. 3 shows the third control method, i.e. the procedure for turning off the horizontal image correcting function during the panning operation.

The image blur correcting apparatus 30 receives the type identification data and other data (panhead type data) outputted from the panhead 10 (S310). Then, the image blur correcting apparatus 30 finds the type of the panhead apparatus 10, and reads the corresponding type data from the storage device (the ROM) 38. The image blur correcting apparatus 30 sets values (thresholds and the like) required for controlling the image blur correcting functions, and turns on the image blur correcting functions (S312).

Then, the image blur correcting apparatus 30 determines whether the panning is performed or not in accordance with a signal outputted from the panhead apparatus 10 (S314). The panhead apparatus 10 outputs signals to the image blur correcting apparatus 30 to indicate that the panning or tilting is being performed or not being performed. The image blur correcting apparatus 30 perceives the operating conditions of the panhead apparatus 10 in accordance with the signals outputted from the panhead apparatus 10.

If the panning is being performed, the image blur correcting apparatus 30 determines whether the panning speed exceeds a preset threshold (a set value) or not (S316). The panhead apparatus 10 outputs signals representing the panning or tilting speed (speed signals) to the image blur correcting apparatus 30 during the panning or tilting operation. The image blur correcting apparatus 30 perceives the panning (or tilting) speed in accordance with the signals outputted from the panhead apparatus 10.

If the panning speed is higher than the preset threshold at S316, the image blur correcting apparatus 30 turns off the horizontal image blur correcting function. On the other hand, if the pan speed is equal to or lower than the preset threshold at S316 or if the panning is not being performed at S314, the horizontal image blur correcting function as well as the vertical image blur correcting function is kept ON.

Although FIG. 3 only shows the case where the horizontal image blur correcting function is turned off during the panning operation, the vertical image blur correcting function may be turned off during the tilting operation in the similar procedure.

In this embodiment, the image blur correcting apparatus 30 has the storage device 38, which contains the type data for the multiple types of the panhead apparatuses. Alternatively, the image blur correcting apparatus 30 may receive the data relating to the performances of the panhead from the panhead apparatus 10 or previously contain only the data relating to the performances of the panhead apparatuses 10 that have probability of being combined with the image blur correcting apparatus 30.

In this embodiment, the image blur correcting apparatus 30 corrects the image blur by moving the correcting lens, but the present invention should not be restricted to this. The image blur may also be corrected by moving a correcting prism, a correcting mirror, or the like, provided on the optical path.

As set forth hereinabove, according to the present invention, the image blur correcting apparatus for the camera is combined with the panhead apparatus, and controls the image blur correcting function and adjusts the sensitivity in accordance with the panhead data signals outputted from the panhead apparatus. Therefore, the image blur correcting apparatus can appropriately compensate the performance of the panhead apparatus to save energy while obtaining a stable image.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image blur correcting apparatus for correcting an image blur resulting from a vibration of a camera, the image blur correcting apparatus comprising:

a signal receiver for receiving a panhead data signal outputted from a panhead apparatus on that the camera is mounted; and a controller for turning on and off an image blur correcting function of the image blur correcting apparatus in accordance with the panhead data signal received through the signal receiver.

2. The image blur correcting apparatus as defined in claim 1, wherein the image blur correcting apparatus moves a correcting lens within a plane perpendicular to an optical axis to thereby correct the image blur.

3. An image blur correcting apparatus for correcting an image blur resulting from a vibration of a camera, the image blur correcting apparatus comprising:

a signal receiver for receiving a panhead data signal outputted from a panhead apparatus on that the camera is mounted; and a controller for adjusting a vibration sensitivity of the image blur correcting apparatus in accordance with the panhead data signal received through the signal receiver.

4. The image blur correcting apparatus as defined in claim 3, wherein the image blur correcting apparatus moves a correcting lens within a plane perpendicular to an optical axis to thereby correct the image blur.

* * * * *